(12) United States Patent
Highnam et al.

(10) Patent No.: US 9,361,683 B2
(45) Date of Patent: Jun. 7, 2016

(54) IMAGING TECHNIQUE AND IMAGING SYSTEM

(76) Inventors: Ralph Highnam, Wellington (NZ); John Michael Brady, Headington (GB)

( * ) Notice: Subject to any disclaimer, the term of this patent is extended or adjusted under 35 U.S.C. 154(b) by 296 days.

(21) Appl. No.: 13/990,181

(22) PCT Filed: Nov. 29, 2011

(86) PCT No.: PCT/GB2011/001658
§ 371 (c)(1),
(2), (4) Date: Sep. 24, 2013

(87) PCT Pub. No.: WO2012/072974
PCT Pub. Date: Jun. 7, 2012

(65) Prior Publication Data
US 2014/0010429 A1  Jan. 9, 2014

(30) Foreign Application Priority Data
Nov. 30, 2010 (NZ) ........................................ 589629

(51) Int. Cl.
*G06K 9/00* (2006.01)
*G06T 7/00* (2006.01)
(52) U.S. Cl.
CPC ............. *G06T 7/0012* (2013.01); *G06T 7/0014* (2013.01); *G06T 2207/10088* (2013.01); *G06T 2207/10136* (2013.01); *G06T 2207/30068* (2013.01)
(58) Field of Classification Search
None
See application file for complete search history.

(56) References Cited

U.S. PATENT DOCUMENTS 7,127,684 B2 * 10/2006 Morita .................. A61B 6/463
382/132
7,308,126 B2 * 12/2007 Rogers ................ G06K 9/3233
128/922

(Continued)

OTHER PUBLICATIONS

Lokate et al., "Volumetric breast density from full-field digital mammograms and its association with breast cancer risk factors: a comparison with a threshold method", Cancer Epidemoil Biomarkers Prev; 19(12) Dec. 2010, published online Oct. 4, 2010.*

(Continued)

*Primary Examiner* — Soo Park
(74) *Attorney, Agent, or Firm* — William H. Bollman (57) ABSTRACT

The present invention relates to an imaging technique and an imaging system and more particularly to an automatic assessment of quantitative measure(s)/properties(s) of an object wherein, for example, an imaging system is used to capture an image, following which image properties are quantified using image processing techniques. An imaging technique obtains an image of an object along a first axis, or by way of a first technique, and subsequently obtains an image of the object along a second axis, or by way of a second technique. One or more pixels from the first image are selected and designated as reference pixels. An automated comparison between corresponding regions of the first and second images are then performed which is based upon the reference pixels, so as to indicate regions of interest.

12 Claims, 4 Drawing Sheets

(56) References Cited

U.S. PATENT DOCUMENTS

| | | | | |
|---|---|---|---|---|
| 8,184,890 B2* | 5/2012 | Zhang | ............... | A61B 6/463 |
| | | | | 128/922 |
| 8,194,947 B2* | 6/2012 | Zingaretti | ............. | G06T 7/0012 |
| | | | | 382/128 |
| 8,503,742 B2* | 8/2013 | Dewaele | ............... | G06T 7/0012 |
| | | | | 382/128 |
| 8,571,174 B2* | 10/2013 | Smith | ............... | A61B 6/025 |
| | | | | 378/37 |
| 8,799,013 B2* | 8/2014 | Gustafson | ............ | A61B 5/4312 |
| | | | | 382/128 |
| 9,008,382 B2* | 4/2015 | Highnam | ............. | G06T 7/0012 |
| | | | | 382/128 |
| 2009/0016580 A1* | 1/2009 | Yamamichi | ............ | A61B 6/502 |
| | | | | 382/128 |
| 2009/0252396 A1* | 10/2009 | Morita | ................ | G06T 7/0081 |
| | | | | 382/132 |
| 2009/0257657 A1* | 10/2009 | Temmermans | ....... | G06T 3/0075 |
| | | | | 382/195 |
| 2010/0124364 A1* | 5/2010 | Huo | ...................... | G06T 7/0012 |
| | | | | 382/128 |
| 2011/0052025 A1* | 3/2011 | Highnam | .............. | G06T 7/0016 |
| | | | | 382/131 |
| 2012/0014578 A1* | 1/2012 | Karssemeijer | ........ | G06T 7/0012 |
| | | | | 382/131 |
| 2012/0257804 A1* | 10/2012 | Zhang | ................... | A61B 6/563 |
| | | | | 382/128 |

OTHER PUBLICATIONS

Engeland et al., "Finding corresponding regions of interest in mediolateral oblique and craniocaudal mammographic views", Med. Phys. 33(9), Sep. 2006.*

* cited by examiner

IMAGING TECHNIQUE AND IMAGING SYSTEM

FIELD OF THE INVENTION

The present invention relates to an imaging technique and an imaging system and more particularly to an automatic assessment of quantitative measure(s)/properties(s) of an object wherein, for example, an imaging system is used to capture an image, following which image properties are quantified using image processing techniques.

BACKGROUND

Imaging systems which automate assessment of images are known. However, particularly in the field of radiography, images or features of an image are often difficult to interpret.

Image processing systems process images to derive certain information, for example, from X-ray or magnetic resonance images (MRI) and diagnostic information and in particular these are used to help in the diagnosis of cancers.

The propensity towards and the onset of cancer has been associated with a variety of factors, such as, exposure to certain chemicals (e.g. asbestos, polycyclic hydrocarbons and compounds contained in cigarette smoke); exposure to ionizing radiation (e.g. x-rays, radioactive fall out and ultra violet light); certain viruses; and the influence of oncogenes.

Other factors of increasing interest include: the parasitic relationship between cancer cells and support tissue around tumours, for example fat, whereby cancerous cells release hydrogen peroxide generating free radicals in neighbouring fibroblasts which prompts the fibroblasts to digest their mitochondria, releasing nutrients that feed the cancers cells.

The relationship between tissue type and breast cancer is particularly prevalent: that is, the higher the density of fibro glandular tissue, the greater the risk of breast cancer. The interaction of the fat and fibro glandular tissue is similarly a critical factor in breast cancer risk and breast cancer development.

Diagnosis comprises both invasive and non-invasive techniques, the latter generally entailing the generation of images from image processing systems. These systems, in breast imaging and other medical diagnostic for a yield different viewing angles, compression, imaging conditions and variation in the composition of tissue over time. Commonly, such images are visually assessed, for example, by radiologists. Visual assessment on the part of a radiologist may be iterative/based on experience and consideration of a number of factors.

Often image processing systems receive images which are closely related, for example, images of the same subject with slight variation in angle of view; or images which have been captured at different times.

Such multiplicity and variety of images can infer more information than a single image. Further, selective information from multiple images can enhance reliability, for example, exposing a hitherto obstructed object. Thus availability of comparative images can help direct and verify the processing.

However, although a variety of diagnostic information is available from a number of images, the diagnostic information is generally used separately, due to the complications of automation and integration, such as the related need to compensate for varying parameters.

To elaborate in respect of mammography, comparative images might comprise cranio-caudal (CC) images and medio-lateral oblique (MLO) images; CC and MLO images of the same breast as well as other views; images of both the left and right breast; and images taken at an earlier time. Due to the size of the images (typically 25-70 Mb) image processing systems, the images are generally processed one image at a time, and the results then collated. For example, computer-aided detection (CAD) systems might indicate that a certain object is of higher confidence if it has been detected in both the CC and MLO views, or, a certain object is of higher confidence of being cancer if it was not present in the previous image, or has no matching object in the other breast.

However, accurate measurement of breast density can be significantly skewed by small fluctuations in measurement; for example, the recent use of slanted compression paddles in mammography examination entails a variation of breast thickness from the chest wall to the breast margin, in some cases up to 2 cm. Such fluctuations in breast height leads to large variations in the estimated breast density, thus slanted compression paddles incur the risk of invalidating many of the models currently used in quantification of volumetric breast density.

It is an object of the invention to avoid this variation and provide a more consistent and reliable technique of imaging so providing a more reliable diagnosis.

PRIOR ART

Attempts to automate assessment are reviewed at length in Yaffe, "Measurement of mammographic density" (Breast Cancer Research, 10:209, 2008), in particular those attempts to automate estimation of breast composition.

Similarly other, non-x-ray systems such as breast MRI, 2D breast ultrasound and 3D breast ultrasound also generate diagnostic information that is on the whole used relatively independently of the other images due to the complications listed above, and the need to match the same object imaged on different systems. Systems such as Volpara® (integrating the method and system disclosed in International Patent Application PCT/2010/0001472), which automate quantitative analysis of breast x-rays: quantifying the breast as numerical representation of the breast tissue in isolation from the imaging procedure. Such systems can work on images taken at different views of the breast, for example the cranio-caudal (CC) and mediolateral oblique (MLO) views, and on images taken over time.

For example, the breast composition as depicted in a mammogram indicates how hard-to-diagnose that mammogram is. The theory is that breasts which consist mainly of denser tissue from an x-ray perspective (fibrous, glandular and other tissues) rather than fat can more easily hide cancers, therefore the greater the quantity of dense tissue the harder-to-diagnose the mammogram is.

To assess characteristics of tissue, for example, the density of breast tissue, image processing systems tend to process the Left CC, Left MLO, Right CC, Right MLO images individually and then average the results to determine an overall breast density for the individual patient. Averaging the results is useful, as it removes noise and reduces errors if, for example, the image processing has failed on any of the individual images.

Although there are many different types of breast tissue (glandular, fibrous etc), most work in this area designates all non-fat tissue as 'dense' tissue. The terms glandular, fibro glandular and dense tissue are consequently used interchangeably. In this description non-fat tissues are referred to as 'dense' tissue.

Previous attempts to quantify hard-to-diagnose mammograms have been listed in Yaffe and Highnam (cited above). Further attempts more specifically related to the American College of Radiology (ACR)'s Breast Imaging and Reporting and Data System (BIRADS®) which is the current most popular classification system for visual assessment of breast composition.

The BIRADS system of classification uses the following categories of patterns:

1. The breast is almost entirely fat (<25% glandular);
2. There are scattered fibro glandular densities (approximately 25-50% glandular);
3. The breast tissue is heterogeneously dense, which could obscure detection of small masses (approximately 51-75% glandular); and
4. The breast tissue is extremely dense. This may lower the sensitivity of mammography (>75% glandular).

Furthermore, BIRADS, and similar classification systems perpetuate the subjective interpretation of the image: while radiologists (and other assessors) are able to identify patterns 1 and 4, the results in-between are far more prone to classification error, see Zhou et al, "Estimation of breast density on mammograms" (Medical Physics, 28 (6), 2001, p 1056-1069); Nicholson et al, "Accuracy of assigned BI-RADS breast density category definitions" (Academic Radiology, 13 (9), p 1143-1149); Ciatto et al, "Categorizing breast mammographic density: intra and inter observer reproducibility of BI-RADS density categories" (Breast, 14, 2005, p 269-275); Berg et al, "BIRADS: inter and intra-observer variability in feature analysis and final assessment" (RJR, 174 (6), p 1769-1777).

Attempts to quantify hard-to-diagnose images more specifically related to the BIRADS system of classification include: Marias et al, "Automatic labeling and BI-RADS characterization of mammogram densities" (27$^{th}$ International Conference of Engineering in Medicine and Biology, p 6394-6398, January 2006); Castella et al, "Semi-automatic mammographic parenchymal patterns classification using multiple statistical features" (Academic Radiology, 14 (12), p 1486-1499, 2008); Marias et al, "Subjective and computer-based characterization of mammographic patterns" (International Workshop on Digital Mammography, 2002); Glide-Hurst et al, "A new method for quantitative analysis of mammographic density" (Medical Physics, vol 34 (11), p 4491-4498, 2007); Glide et al, "Novel approach to evaluation breast density using ultrasound tomography" (Medical Physics, vol 34 (2), p 744-753, 2007).

While various methods are used to compute either a volumetric breast composition, based around actual volumes of tissue in the breast, or to make the visual assessment of breast composition objective and quantitative, it has been established that area based measurements far better describe "hard-to-diagnose" images than volumetric techniques.

Methods attempting to use texture and image characteristics to determine a quantitative visual density classification leave unresolved other integral considerations, such as how to differentiate between all fat and all dense tissue, where the texture is the same and thus of low contrast, and between the middle ranges of breast density categories.

Standardization of volumetric appraisal per se has some advantages in mammographic image processing and appraising breast cancer risk. However, use of fixed values is only possible where such are reliable. For example, cancers are usually visible in a mammogram from 0.5 cm or above. A region of dense tissue which is small in projected diameter, for example up to 0.3 cm, will not impede cancer detection as it is too small either to mask a real cancer or to be identified as a cancer. However, areas of tissue above 0.3 cm in depth and/or diameter could impede cancer detection.

Despite the success of currently available systems, certain challenges remain in the art. These include: a lack of automation; minimal correlation of modalities and/or results; non-comparative 'matching' whether temporal, quantitative or substantive; non-continuous classification spectrum; and non-contextual reference (i.e. physiological).

It is thus an object of the present invention to provide a system for the automatic assessment of quantitative measure(s)/properties(s) of an object comprising simultaneous or selective references to a range of diagnostic markers from multiple images processing systems and in particular so provide a system for automatic assessment based on a range of diagnostic markers of predetermined importance and measures/properties.

Another object is to selectively and simultaneously combine the means of formulation of results to produce a more accurate diagnosis, for example, via a diagnostic 'score technique', thereby enhancing the uniformity of such a diagnostic score.

SUMMARY OF THE INVENTION

According to a first aspect of the invention there is provided an imaging technique that obtains an image of an object along a first axis and subsequently obtains an image of the object along a second axis; selecting one or more pixels from the first image; designating these as reference pixels; and performing an automated comparison between corresponding regions of the first and second images, based upon the reference pixels, so as to indicate regions of interest.

According to a second aspect of the invention there is provided an imaging technique that obtains an image of an object using a first imaging technique and subsequently obtains an image of the object using a second imaging technique; selecting one or more pixels from the first image; designating these as reference pixels; and performing an automated comparison between corresponding regions of the first and second images, based upon the reference pixels, so as to indicate regions of interest.

The present invention therefore relates to a system wherein appraisal of a range of predetermined diagnostic markers directs forward looking treatment that is sensitive to risk by assessing the relevant importance of pixels.

It is appreciated that although reference is made to pixel, that this term is intended to include the term voxel.

According to another aspect of the present invention there is provided a system for the automatic assessment of quantitative measure of an object whereby an imaging system is used to capture an image and then an image processing system is used to quantify a certain image property.

Preferably in the imaging system simultaneous automatic assessment of first and second images is performed, by way of a plurality of diagnostic markers, each marker having a predetermined significance relating to a level of risk.

The process might simultaneously and variously comprise: matching diagnostic information from various systems; modeling geometric changes using density measurements; matching/comparing features/regions of interest over time; comparing density in combination with some other CAD marker; computing density from CC and MLO images mapped to 3D scan; grading a continuous spectrum; selectively combining certain values; using proximal physiology as a comparator; using case based referencing (such as L CC, L MLO, R CC, R MLO); adjusting for slant; improving segmentation; comparing statistical histograms; using a fatty tissue reference point; and statistically comparing tissue images from two breasts.

Thus integral considerations are resolved such as differentiating between all fatty and all dense tissue, and deciphering 'hard-to-diagnose' images for improved diagnostic and treatment outcomes.

The present invention thus relates to automatic assessment of quantitative measurement and diagnostic markers within the context of breast imaging.

Advantageously the system for the automatic assessment of quantitative measure integrating computation of breast density is computed by Volpara® (or similar methods) in order to aid the matching of diagnostic information from various systems.

Whereas current techniques generally use the skin outline, pectoral muscle outline, and optionally breast thickness, the present invention includes skin outline, pectoral muscle outline, optionally breast thickness and breast density.

In a preferred embodiment, the invention performs matching between CC and MLO mammograms. The amount of compression of the breast and degree of movement of objects inside the breast during compression, indicates softness or hardness of the breast; which in turn is indicative of breast density. The higher the breast density, the harder the breast and the less movement of objects inside the breast during compression. Hence the greater the movement of objects inside a fattier breast during compression.

In order to accurately correlate information in the CC and MLO views, the geometric changes are modeled and breast density used, to set the search boundaries around which the automated system should look for a matching object in the other view. Lower breast densities tend to indicate fattier breasts and potentially larger movement indicating a large search region.

Preferably the system for the automatic assessment of quantitative measurement of an object which includes: matching objects displayed in temporal mammograms.

A feature or 'object' that appears in one mammogram but which was not present in a previous mammogram might indicate a developing cancer. Similarly, an object that appears larger in a later mammogram might also indicate a cancer. Conversely, an object which appears smaller in a later mammogram is unlikely to be a cancer. However, differences in breast compression and breast density complicate the identification and matching of objects in mammograms over time. While breast thickness and skin outlines can be used to determine where to look, a fattier breast offers a far greater range of potential movement and the search region should consequently rely on breast density. Such use of density, thus enables breast density assessment tools to simulate CAD: an increase in regional breast density indicates possible cancer.

Ideally a correlation is performed using information from breast density and CAD and in particular matching a regional breast density and a CAD result.

Cancers generally form in dense tissue, thus, the correlation of a CAD marker plus a surrounding regional area of density may be more indicative of a potential cancer than a CAD marker in fatty region. Breast density can therefore 'weight' the CAD marker. Equally, a breast with no CAD markers and low breast density may indicate a low risk of a cancer and possibly not require the image to be read by one or more radiologist.

Ideally matching between CC and MLO x-rays and another 3D imaging technique such as MRI and 3D ultrasound is carried out. It has been suggested that as few as 20% of objects seen in MRI are also found in ultrasound, and matching between x-ray and MRI is similarly difficult. A particularly preferred embodiment of the present invention computes the breast density for the CC and MLO images and identifies regions of high density in both views, thereby indicating features that require further investigation.

Furthermore, the present invention enables mapping from CC and MLO to 3D using techniques such as suggested by Kita, Highnam and Brady with the inclusion of a breast density factor to improve accuracy. The 3D breast generated with object location can then be shown to a radiologist who can directly focus attention accordingly, that is, on the areas of the breast which have high x-ray breast density, via one or other, or a number of 3D imaging techniques for matching signs. This represents a significant advantage in applications such as breast ultrasound where a radiologist rarely has time to scan an entire breast. The results can be conveyed to the radiologist in several forms, including a DICOM secondary capture image with a small 3D breast represented in it.

It is a further advantage of the present invention that the range and grading of breast tissue composition is expressed as continuous spectrum for example in the form of a percentage of composition, or numerically, thus enhancing the accuracy for indication and further diagnosis purposes. For example, grading can be expressed as a percentage between 0% to 40%. Alternatively, the grade of breast tissue composition comprises a continuous range between 1 and 4, for example, 2.4, 3.2 et cetera. Thus the present invention enhances systems such as BI-RADS®.

According to a yet further aspect of the invention employs diagnostic markers that comprise selectively combining values generated from quantitative representation. The values are from the group comprising: the average thickness of dense tissue; variance of dense tissue/changes in density and/or confusing heterogeneity in an image; maximum thickness of dense tissue; an area based measure i.e. any area of the breast with a thickness of dense tissue and/or diameter of dense tissue of less than 0.3 cm whereby the total dense area(s) is divided by the total glandular disk area to get an area measure of how hard-to-diagnose the mammogram is; and additionally a categorization, such as the American College of Radiology (ACR)'s Breast Imaging and Reporting and Data System (BIRADS®).

Preferably the resolution of proximal tissue, for example the resolution of the pectoral muscle, is used as a comparator or contrast to more accurately assess the density of the breast tissue. The pectoral muscle is dense, usually denser than breast tissue, thus where the breast is not very dense the pectoral muscle area when imaged on a MLO image will appear brighter than the main breast area.

Where the contrast is large between the whiteness of the pectoral muscle area and the whiteness of the breast or areas thereof, the comparative contrast indicates that the main breast is not very dense. If the main breast tissue is dense, then the comparative contrast difference between pectoral and main breast tissue is low. If the pectoral happens to be fatty (which can occur), then the contrast difference may appear negative, and no conclusion will be safely drawn. If it is known that a particular breast is not very dense, then processing of the CC images can be adjusted to more safely detect a reference area of all fat.

According to a further aspect the system comprises study based improvements referencing a Left CC, Left MLO, Right CC, Right MLO and case based improvements which include temporal data where case implies multiple studies over time.

It is a further feature that densities/breast volumes/volume of fibro glandular tissue is computed for each image and the results collated only when the results are comparable. For example, if

L CC=5%, R CC=6%, L MLO=25%, R MLO=6%,

L MLO would be ignored as an outlier. Note, however, that if the left or right breast appeared uniformly higher than the other, this may indicate a cancer or other genuine change (such as post-operative) rather than an outlier. Similarly, a uniform increase or decrease in density over time would indicate genuine change rather than outlier.

According to a further aspect of the present invention there is provided a system for the automatic adjustment of compression slant, in particular according to the method disclosed in the co-pending Application NZ595136 'Method for enhancing quantification of images with symmetrical effect'. The slant computed with this method can be checked for plausibility by considering Breast Volume, Recorded Breast Thickness and Projected Area. If the breast volume is expected to be the same, estimation of slant is adjusted until matched for all images.

Ideally automated assessment comprises: improved segmentation, where the same shape of breast is looked for in all images, and therefore calculation of breast volume improved. A further feature is the removal of non breast at the bottom of the image or fatty tissue at pectoral muscle at the top of the image in MLO, thus improving the overall results.

Optionally histograms of the inner breast across all images are compared and the composition checked for similarity, thereby detecting air pockets or not completely compressed regions where they only occur only in one image. Certain statistics of the histograms, e.g. the skewness, might also be averaged over all images to achieve a more reliable value which can then be used to adjust the image processing.

Advantageously the automated assessment system identifies a correct fatty reference point found in any single image and the relationship of the fatty reference point is compared to the rest of the breast pixels. For example, the number of points which are brighter than the potential reference spot and the number of points which are less bright might be calculated in the different views: and if they are equal there the reference spot is likely more reliable.

Furthermore, a fatty reference point may be sought in the same area of the left breast and right breast, if it has been reliably detected in one of the images. The reliability of the fatty reference point can be verified by looking at the spatial distribution of points which have a similar brightness as the fatty reference point.

A further iterative approach to compute density. Start with an initial reference spot and initially assumed compression plate slant. Then compute dense tissue using these values. Then check if dense tissue distribution meets constraints, constraints can be spatial distribution of points with thickness of dense tissue equals zero, statistics of the occurring density values. Constraints could also include information from other images of the same case.

According to a further aspect, preceding, temporal data is used comparatively to adjust processing, diagnosis and risk analysis.

According to an even further aspect the present invention relates to a process whereby statistics for two breasts are compared, for example, percentage of breast with h_int>recorded breast thickness, percentage of breast with h_int<0, percentage of breast edge with h_int>0, where h_int is the thickness of dense tissue. Significant difference in the statistics indicated error.

According to another aspect the present invention relates to a process whereby all images in a study are heavy mosaic images except one. Knowing how much tissue is cut away, the images can still be processed, by comparing the breast volumes of the mosaic images to the breast volume of the proper image.

According to another aspect the present invention relates to an iterative process to improve the calculation of density. In this process the starting point is an initial estimate for the fatty reference point as well as an initial estimate of the compression plat slant. The density values computed with these initial estimates are checked against a set of constraints which can comprise several aspects of aspect eight. If the density values do not meet the constraints, the reference fatty point as well as the value for the compression plate slant are adjusted. These two steps are repeated until the density values meet the constraints.

It is an advantage of the present invention that the aspects described are simultaneously and variously integrated in an automated system.

A better understanding of the nature and advantages of the present invention may be gained with reference to the following detailed description and the accompanying drawings.

DETAILED DESCRIPTION OF PREFERRED EMBODIMENTS OF THE INVENTION

Figure 1:
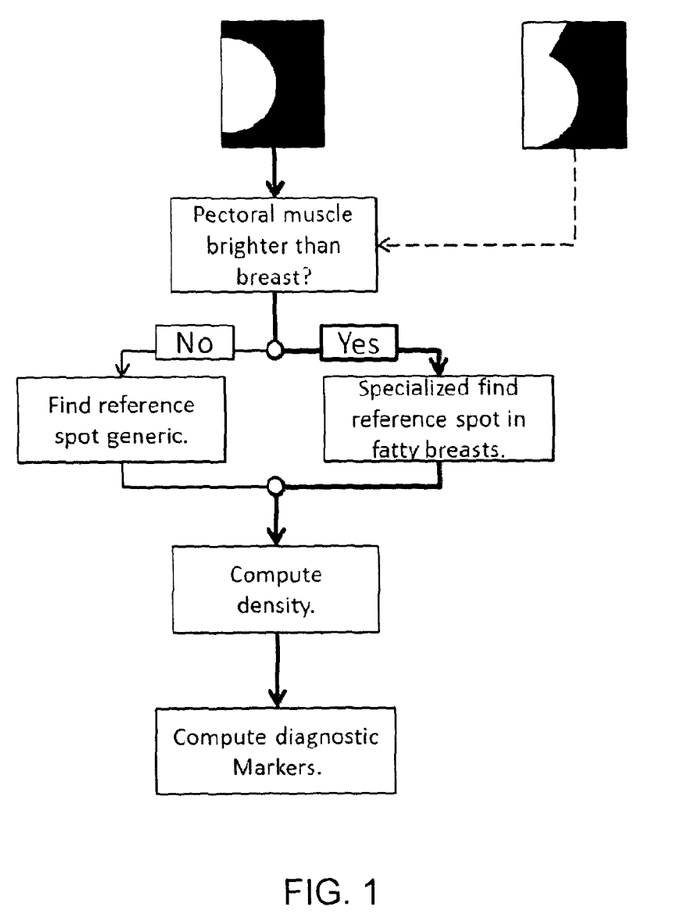
FIG. 1 shows system comprising selectively combined values generated from quantitative representation and comparative resolution of pectoral muscle.
Figure 2:
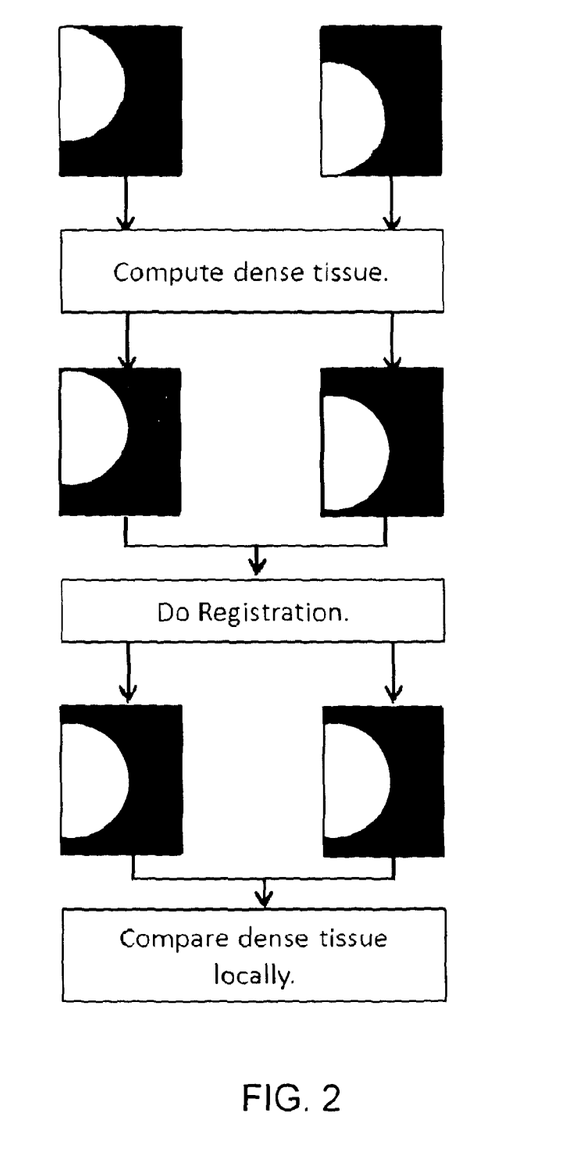
FIG. 2 shows temporal comparison: compute dense tissue, do registration/match breasts, then look for changes in density.
Figure 3:
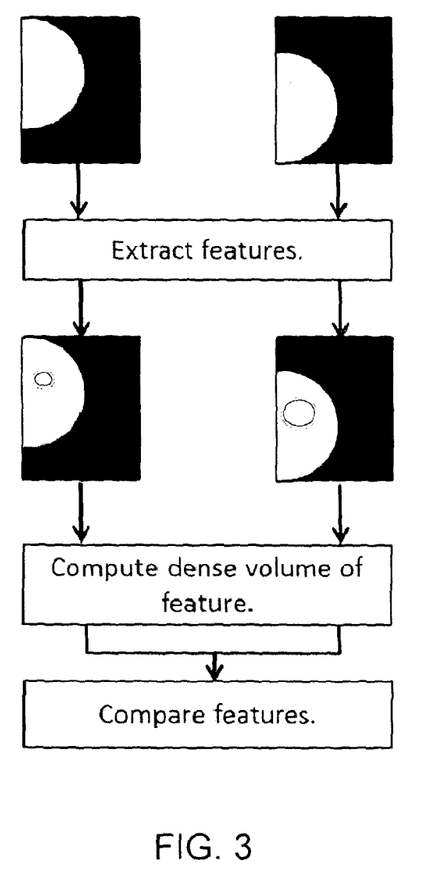
FIG. 3 shows temporal comparison of the same breast without registration, only feature based.
Figure 4:
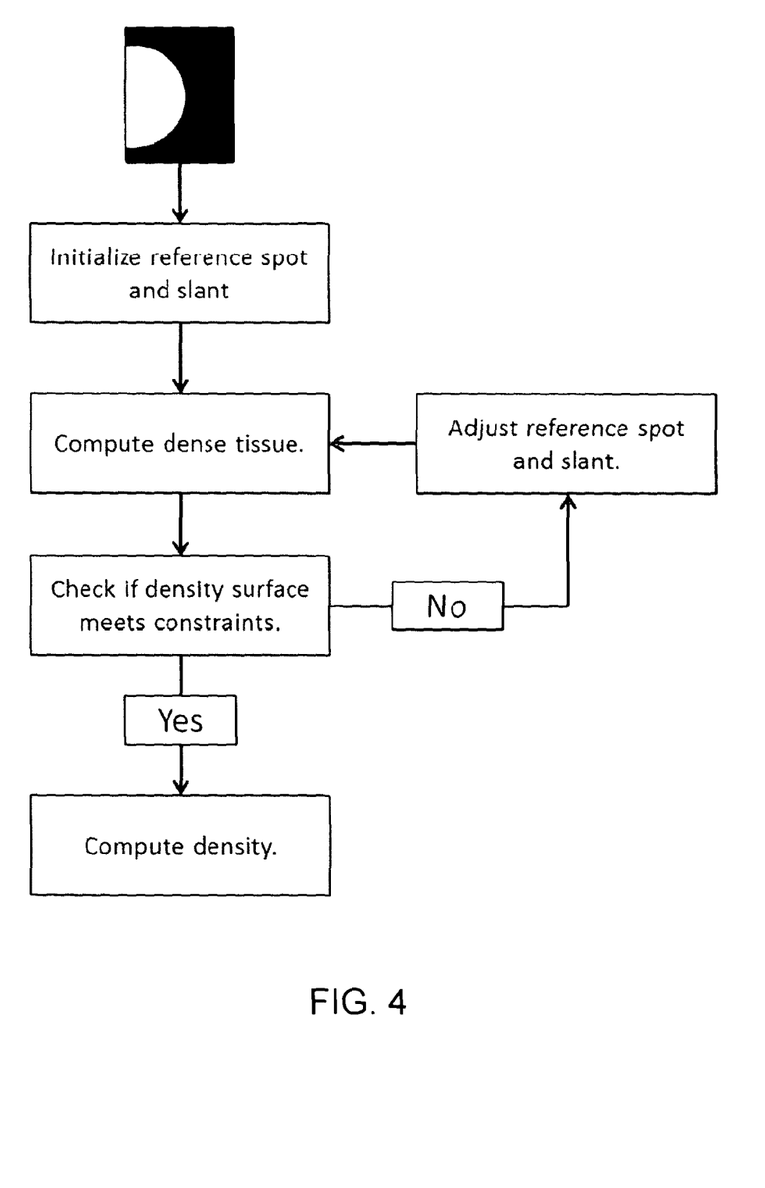
FIG. 4 shows an iterative approach to compute density.

In a preferred embodiment combinations of values generated from our quantitative representation are selectively used and might comprise for example:

1. The average thickness of dense tissue over the glandular disk (or whole breast), this is effectively the spread of dense tissue over the image where high values indicate that a cancer might be hiding in the image.

2. Variance of dense tissue over the glandular disk, to reflect the changes in density and thus confusing heterogeneity seen in the image.

3. The maximum thickness of dense tissue over the glandular disk, as this depicts the hardest place to see a cancer.

4. An area based measure as indicated by the observations above, namely we say that any area of the breast with less than a certain thickness of dense tissue (0.3 cm, for example) is easy to see cancer in, and any area of the breast with dense tissue but which is under a certain diameter (say 0.3 cm, for example) is also removed. We then divide the total dense areas by the total glandular disk area to get an area based measure of how hard-to-diagnose the mammogram is. This should correlate well with the BIRADS scheme.

5. As well as an area-based density figure (0-100%) we could also provide a categorization, such as BIRADS.

Example embodiments have been described above regarding a system for combining the results of a number of systems, and in particular diagnostic systems such as breast imaging systems. Various modifications to and departures from the disclosed example embodiments will occur to those having ordinary skill in the art.

The subject matter that is intended to be within the spirit of this disclosure is set forth in the following claims.

The invention claimed is:

1. A method of indicating regions of interest in a breast by comparing a cranio-caudal (CC) image and a medio-lateral oblique (MLO) image, comprising:
   obtaining a first image of an object in a breast in a first region along a first axis;
   subsequently obtaining a second image of the object in the breast in a corresponding first region along a second axis;
   selecting one or more pixels indicative of a breast density from one of the first image and the second image;
   determining the breast density from a whiteness of the one or more pixels;
   identifying geometric changes in the breast based on the breast density;
   defining a boundary enclosing the first region such that a size of the first region is inversely related to the breast density; and
   performing an automated comparison operative to look for the object in the first region by comparing the first region of the first image and the corresponding first region in the second image.

2. The imaging technique according to claim 1, further comprising:
   simultaneously automatically assessing the first image and the second image by way of a plurality of diagnostic markers, each of the plurality of diagnostic markers having a predetermined significance relating to a level of risk.

3. The imaging technique according to claim 2, wherein at least one additional technique is performed to enhance at least one of the first image and the second image, the additional technique being selected from a group comprising:
   matching diagnostic information from various systems;
   modeling geometric changes using density measurements;
   matching/comparing features/regions of interest over time;
   comparing density in combination with a CAD marker;
   computing density from CC and MLO images mapped to a 3D scan;
   grading a continuous spectrum;
   selectively combining certain image values;
   using physiology as a comparator;
   using case based referencing (such as L CC, L MLO, R CC, R MLO);
   adjusting for slant;
   improving segmentation; comparing statistical histograms;
   using a fatty tissue reference point; and
   statistically comparing tissue images from two breasts.

4. The imaging technique according to claim 3, further comprising:
   differentiating between all fatty and all dense tissue.

5. The imaging technique according to claim 4, further comprising:
   deciphering at least one of the first image and the second image as a 'hard-to-diagnose' image for an improved diagnostic and treatment outcome.

6. The imaging technique according to claim 5, further comprising:
   automatically assessing a quantitative measurement and a diagnostic marker within a context of breast imaging.

7. The imaging technique according to claim 6, further comprising:
   automatically assessing a quantitative measure by integrating computations of breast density as computed by a Volpara® technique.

8. The imaging technique according to claim 6, wherein at least one of:
   a skin outline, and/or
   a pectoral muscle outline, and/or
   a breast thickness
   is/are used to obtain a value of the breast density.

9. The imaging technique according to claim 1, further comprising:
   matching between a CC mammogram and an MLO mammogram.

10. The imaging technique according to claim 9, further comprising:
    modeling the identified geometric changes in the breast; and
    using the breast density, establishing a search boundary around which the automated comparison determines a matching object in the other of the first image and the second image.

11. The imaging technique according to claim 10, further comprising:
    automatically assessing a quantitative measurement of the object, said assessing including matching a plurality of objects displayed in temporal mammograms.

12. The imaging technique according to claim 11, further comprising:
    matching a CC and MLO x-ray image with another 3D image obtained from at least one of an MRI and/or a 3D ultrasound.

* * * * *